(12) United States Patent
Joh et al.

(10) Patent No.: US 11,092,247 B2
(45) Date of Patent: Aug. 17, 2021

(54) VALVE ASSEMBLY

(71) Applicant: LAON TMD CO., LTD., Hwaseong-si (KR)

(72) Inventors: Gil Young Joh, Yongin-si (KR); Jong Hak Kim, Uiwang-si (KR)

(73) Assignee: LAON TMD CO., LTD., Hwaseong-si (KR)

( * ) Notice: Subject to any disclaimer, the term of this patent is extended or adjusted under 35 U.S.C. 154(b) by 0 days.

(21) Appl. No.: 16/754,237

(22) PCT Filed: Oct. 15, 2018

(86) PCT No.: PCT/KR2018/012113
§ 371 (c)(1),
(2) Date: Apr. 7, 2020

(87) PCT Pub. No.: WO2019/074340
PCT Pub. Date: Apr. 18, 2019

(65) Prior Publication Data
US 2020/0278034 A1 Sep. 3, 2020

(30) Foreign Application Priority Data
Oct. 13, 2017 (KR) .......................... 10-2017-0133123

(51) Int. Cl.
*F16K 3/314* (2006.01)
*F16K 3/18* (2006.01)
(Continued)

(52) U.S. Cl.
CPC .............. *F16K 3/314* (2013.01); *F16K 3/182* (2013.01); *F16K 27/044* (2013.01); *F16K 51/02* (2013.01); *F16K 49/00* (2013.01)

(58) Field of Classification Search
CPC . F16K 3/182; F16K 3/18; F16K 3/184; F16K 3/314; F16K 51/02
See application file for complete search history.

(56) References Cited

U.S. PATENT DOCUMENTS 2,626,774 A * 1/1953 Palmer .................... F16K 3/182
251/169
4,495,966 A * 1/1985 Longamore ............. F16K 3/182
137/572
(Continued)

FOREIGN PATENT DOCUMENTS

JP 2014129879 7/2014
KR 100544299 1/2006
(Continued)

OTHER PUBLICATIONS

International Search Report—PCT/KR2018/012113 dated Feb. 1, 2019.

*Primary Examiner* — David Colon-Morales
(74) *Attorney, Agent, or Firm* — Cantor Colburn LLP (57) ABSTRACT

Provided is a valve assembly including: a valve housing inserted into, after removing a portion of an exhaust line of a vacuum chamber, the removed portion of the exhaust line to be open in a direction communicating with the exhaust line and to have a predetermined inner space in a direction perpendicular to the direction communicating with the exhaust line; a valve movable horizontally inside the valve housing to allow the valve housing to communicate with the exhaust line or to be blocked from the exhaust line; a valve driving part disposed on one side of the valve housing in such a manner as to be connected to the valve so as to horizontally move the valve in a direction perpendicular to the exhaust line; and valve movement guide parts disposed inside the valve housing so as to guide a moving path of the valve.

1 Claim, 7 Drawing Sheets

(51) Int. Cl.
*F16K 51/02* (2006.01)
*F16K 27/04* (2006.01)
*F16K 49/00* (2006.01)

(56) References Cited

U.S. PATENT DOCUMENTS

| | | | | |
|---|---|---|---|---|
| 5,269,491 | A * | 12/1993 | Reynolds | F16K 51/02 251/169 |
| 6,612,546 | B2 * | 9/2003 | Young | F16K 3/184 251/158 |
| 7,766,305 | B2 * | 8/2010 | Kim | F16K 3/184 251/203 |
| 7,871,061 | B1 * | 1/2011 | Mandeville, Jr. | F16K 3/04 251/169 |
| 9,121,515 | B2 * | 9/2015 | Yamamoto | B65G 49/00 |
| 9,404,589 | B2 * | 8/2016 | Ishigaki | F16K 51/02 |
| 9,429,239 | B2 * | 8/2016 | Jee | F16K 51/02 |
| 9,470,319 | B2 * | 10/2016 | Yang | F16K 3/182 |
| 9,599,233 | B2 * | 3/2017 | Ishigaki | F16K 27/044 |
| 9,791,052 | B2 * | 10/2017 | Blecha | F16K 3/16 |

FOREIGN PATENT DOCUMENTS

| | | | |
|---|---|---|---|
| KR | 100779241 | 11/2007 | |
| KR | 100952115 | 4/2010 | |
| KR | 20110097395 | 8/2011 | |
| WO | WO-2011105737 A2 * | 9/2011 | F16K 51/02 |

* cited by examiner

FIG. 1

*Prior Art*

VALVE ASSEMBLY

TECHNICAL FIELD

The present invention relates to a valve assembly and, more particularly, to a valve assembly that is capable of being easily installed in an exhaust line of a vacuum chamber and allowing a valve to become a portion of the exhaust line in such a manner as to be moved horizontally, so that process contaminants and by products can be perfectly prevented from flowing into the valve assembly and an excellent exhaust effect can be obtained.

BACKGROUND ART

In a field of manufacturing precision products such as semiconductors, LDCs, LEDs, and solar cells, generally, a manufacturing process is carried out by means of vacuum equipment whose internal pressure is kept lower than an atmospheric pressure. In addition to the vacuum equipment, a vacuum pump is provided to suckedly exhaust internal air of the vacuum equipment so that the internal pressure of the vacuum equipment is kept lower than the atmospheric pressure, and an exhaust line is provided to connect the vacuum pump and the vacuum equipment.

Figure 1:
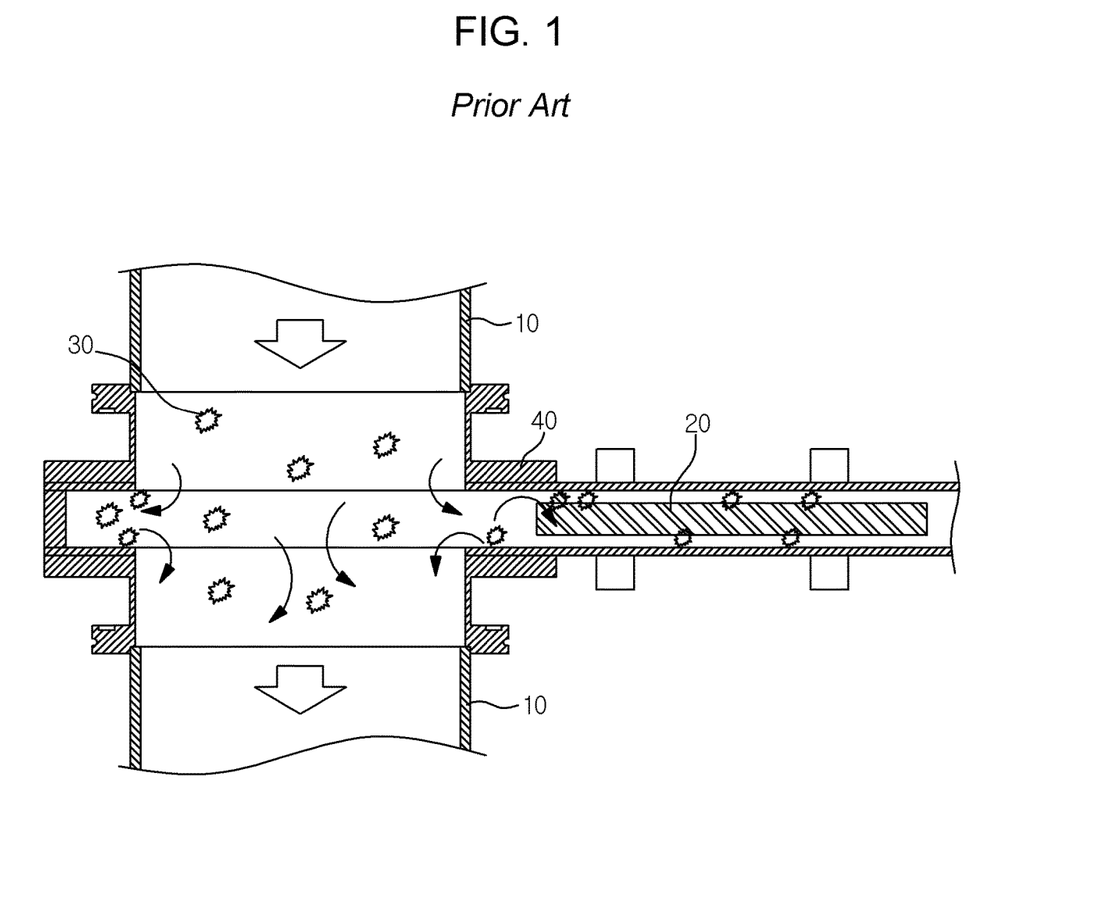
FIG. 1 is a sectional view showing a conventional gate valve.

On the exhaust line, further, a gate valve is mounted to open and close the exhaust line itself. As shown in FIG. 1, a conventional gate valve is mounted on the intermediate portion of the exhaust line 10 and includes a valve housing 40, a valve 20, and a valve driving part (not shown).

Firstly, the valve 20 serves to block the exhaust line in such a manner as to be moved in a perpendicular direction to the exhaust line 10. Secondly, the valve housing 40 provides a moving path of the valve 20 and is located on the exhaust line 10 to prevent the exhaust gas emitted from the exhaust line 10 from leaking to the outside. Lastly, the valve driving part is coupled to the rear end of the valve 20 to drive the valve 20.

By the way, as shown in FIG. 1, the conventional gate valve is configured to have a space between the valve 20 and the valve housing 40 not blocked at all, so that process contaminants or pollutants 30 discharged from the exhaust line 10 may be undesirably accumulated in the interior of the valve housing 40 and on the outer peripheral surface of the valve 20.

If so, the valve housing 40 and the valve 20 may corrode so that a driving failure occurs to thus require frequent repair and unnecessary friction occurs to thus make exhaust performance deteriorated.

DISCLOSURE

Technical Problem

Accordingly, the present invention has been made in view of the above-mentioned problems occurring in the prior art, and it is an object of the present invention to provide a valve assembly is capable of being easily installed in an exhaust line of a vacuum chamber and allowing a valve to become a portion of the exhaust line in such a manner as to be moved horizontally, so that process contaminants and by products can be perfectly prevented from flowing into the valve assembly and an excellent exhaust effect can be obtained.

Technical Solution

To accomplish the above-mentioned object, according to the present invention, there is provided a valve assembly including: a valve housing inserted into, after removing a portion of an exhaust line of a vacuum chamber, the removed portion of the exhaust line in such a manner as to be open in a direction communicating with the exhaust line and to have a predetermined inner space in a direction perpendicular to the direction communicating with the exhaust line; a valve movable horizontally inside the valve housing in such a manner as to allow the valve housing to communicate with the exhaust line or to be blocked from the exhaust line; a valve driving part disposed on one side of the valve housing in such a manner as to be connected to the valve so as to horizontally move the valve in a direction perpendicular to the exhaust line; and valve movement guide parts disposed inside the valve housing so as to guide a moving path of the valve.

According to the present invention, desirably, the valve housing includes: a housing body for providing a horizontal movement space of the valve; and a pair of openings open in the direction communicating with the exhaust line in a state of being coupled to the exhaust line.

According to the present invention, desirably, the valve includes: an upper blade adapted to allow an upper side opening of the pair of openings to communicate with the exhaust line or to block from the exhaust line; a lower blade located under the upper blade in parallel with the upper blade and adapted to allow a lower side opening of the pair of openings to communicate with the exhaust line or to block from the exhaust line; a blade connecting member disposed between the upper blade and the lower blade to connect the upper blade and the lower blade with each other so that a distance between the upper blade and the lower blade is freely varied; and a plurality of protrusions protruding from the sides of the upper blade and the lower blade in such a manner as to be slidably coupled to the valve movement guide parts.

According to the present invention, desirably, the upper blade includes: a communication hole penetrated thereinto in a thickness direction thereof; a sealing portion formed close to the communication hole and having a sealing member insertion groove having the same size as the communication hole; and a sealing member inserted into the sealing member insertion groove in such a manner as to block a gap between the upper blade and the valve housing if the sealing portion blocks the upper side opening of the valve housing.

According to the present invention, desirably, the valve driving part includes: a blade connector located inside the valve housing in such a manner as to be coupled to the upper blade and the lower blade, respectively; a power supplier located at the outside of the valve housing to supply power for horizontally moving the blade connector; and a connection shaft adapted to connect the power supplier with the blade connector.

According to the present invention, desirably, the blade connector includes: a connection block having a pair of long holes formed spaced apart from each other by a given distance in the same direction as the horizontal moving direction; a pair of sliding blocks slidably mounted on the long holes; and a pair of connection pins whose one end is rotatably coupled to the corresponding sliding block and whose other end is rotatably coupled to the inner surface of the upper blade or the lower blade.

According to the present invention, desirably, the valve assembly further includes heating parts located close to the openings of the housing body to heat an interior of the valve housing.

According to the present invention, desirably, the valve assembly further includes a positive pressure keeping part located on the housing body to inject inert gas into a space between the housing body and the valve.

According to the present invention, desirably, the valve assembly further includes: a pressure keeping line passed through the housing body in such a manner as to allow one end to be open to a chamber side exhaust line of the exhaust line and to allow the other end to be open to a pump side exhaust line of the exhaust line; and a slow pumping valve located on the pressure keeping line to control the pressure keeping line.

According to the present invention, desirably, the housing body includes: a lower body having a shape of a container whose top is open and having the predetermined inner space; and a body cap coupled to top of the lower body to cover the open top of the lower body, and the pair of openings is formed on the lower body and the body cap.

According to the present invention, desirably, the valve assembly further includes bearings mounted on the sides of the upper blade and the lower blade to reduce frictional forces generated between the sides of the upper blade and the lower blade and the inner surfaces of the housing body.

According to the present invention, desirably, the pair of connection pins is formed at an acute angle in a direction where the pair of sliding blocks faces each other.

According to the present invention, desirably, the valve assembly further includes a housing connection line communicating with the intermediate portion of the pressure keeping line and also communicating with the internal space of the valve housing.

According to the present invention, desirably, the valve assembly further includes an insulation plate located between the valve housing and the power supplier to block heat transfer between the valve housing and the power supplier.

According to the present invention, desirably, the valve movement guide parts are formed by engraving the inner surfaces of the valve housing and have horizontal sections and inclined sections so as to guide the valve to the communicating and blocking positions.

Advantageous Effects

According to the present invention, the valve assembly can be easily installed in the exhaust line of a vacuum chamber and allow the valve to become a portion of the exhaust line in such a manner as to be moved horizontally, so that process contaminants and by products can be perfectly prevented from flowing into the valve assembly and an excellent exhaust effect can be obtained.

BEST MODE FOR INVENTION

Hereinafter, an explanation on the present invention will be in detail given with reference to the attached drawing.

Figure 2:
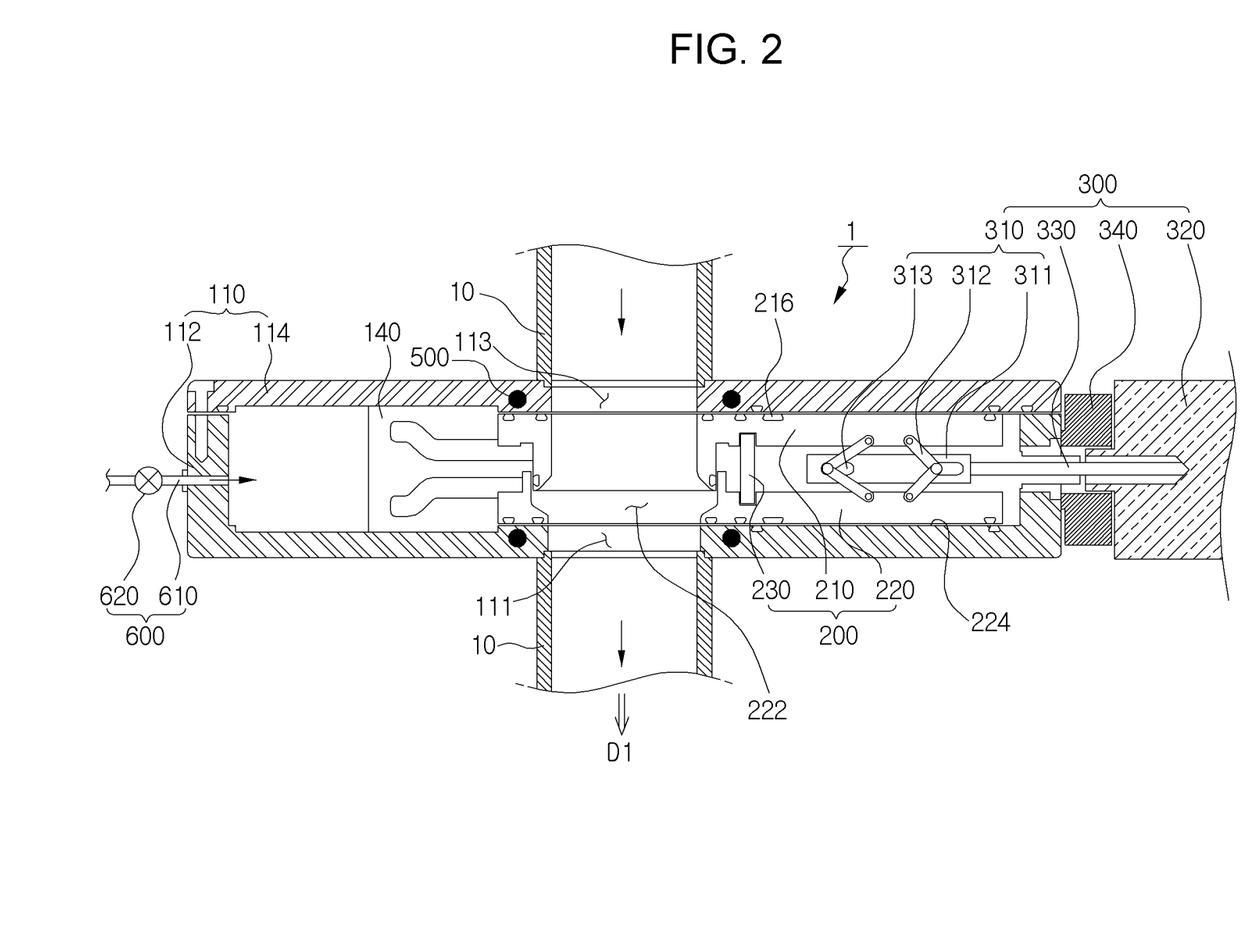
FIG. 2 is a sectional view showing a valve assembly according to the present invention.
Figure 3:
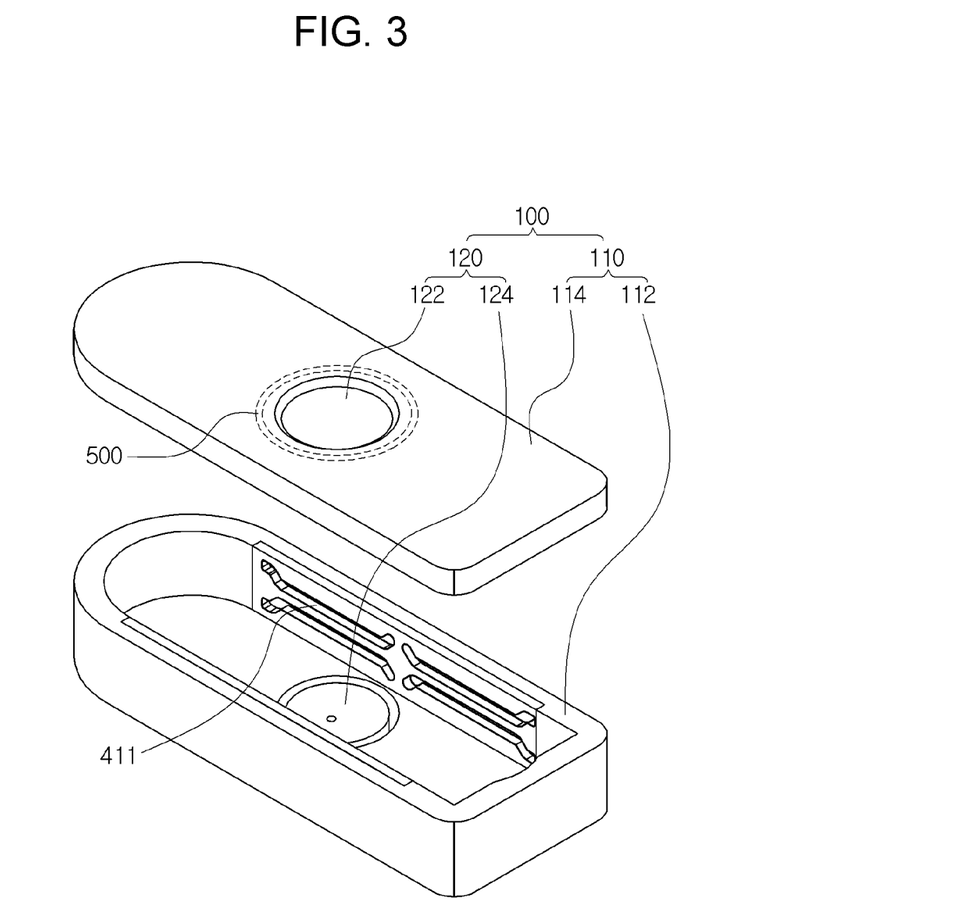
FIG. 3 is a perspective view showing a valve housing of the valve assembly according to the present invention.
Figure 4:
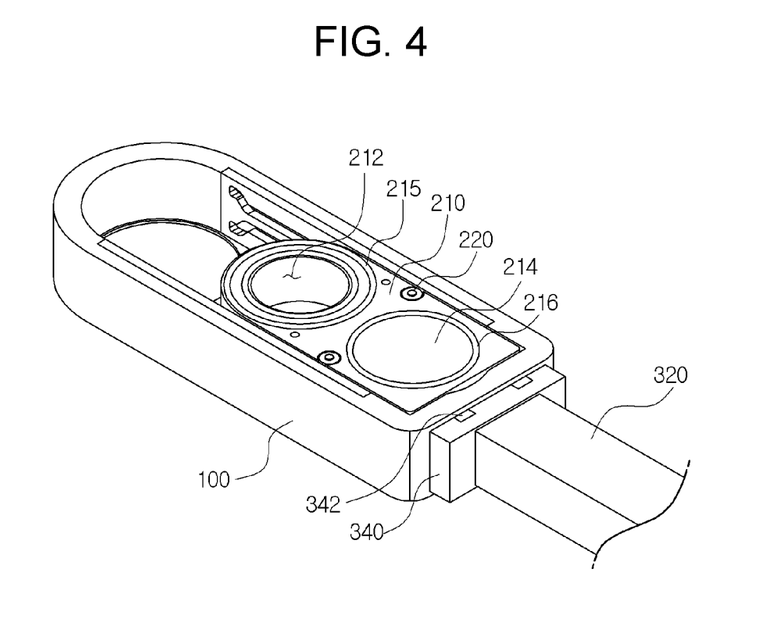
FIG. 4 is a perspective view showing the valve assembly according to the present invention.

As shown in FIGS. 2 to 4, a valve assembly 1 according to the present invention 1 includes a valve housing 100, a valve 200, a valve driving part 300, and valve movement guide parts 140.

After a portion of a vacuum chamber exhaust line 10 is removed, as shown in FIG. 2, the housing body 110 is inserted into the removed portion of the exhaust line 10 to provide an installation space for other components of the valve assembly 1. Further, as shown in FIGS. 2 and 3, the housing body 110 including openings 111, 113 is open in a direction communicating with the exhaust line 10 and has a predetermined internal space in a direction perpendicular to the direction communicating with the exhaust line 10. As shown in FIG. 2, the direction communicating with the exhaust line 10 means a direction along which exhaust gas flows from the exhaust line 10, which is a direction D1 from top toward the bottom in the figure.

In detail, as shown in FIG. 3, the valve housing 100 includes a housing body 110 and a pair of openings 120 including openings 122, 124. The housing body 110 has a predetermined space formed therein to horizontally move the valve 200 therein, and the pair of openings 120 including openings 122, 124 is open in the direction communicating with the exhaust line 10 in a state of being coupled to the exhaust line 10.

In more detail, as shown in FIG. 3, the housing body 110 includes a lower body 112 having a shape of a container whose top is open and having the predetermined inner space and a body cap 114, and the body cap 114 is coupled to top of the lower body 112 to cover the open top of the lower body 112. Further, the pair of openings 120 is formed on the lower body 112 and the body cap 114.

Further, as shown in FIGS. 2 and 4, the valve 200 is horizontally movable inside the valve housing 100 and serves to allow the exhaust line 10 to communicate therewith or block therefrom, while being horizontally moving inside the valve housing 100. According to the present invention, the valve 200 has a double blade structure so that airtightness can be perfectly achieved in the communicating and blocking processes, and in detail, the valve 200 includes an upper blade 210, a lower blade 220, a blade connecting member 230, and protrusions 240.

First, the upper blade 210 and the lower blade 220 are symmetrically located on top and bottom of the valve 200 and in such a manner as to allow their distance to be varied by means of the blade connecting member 230. As a result, the upper blade 210 and the lower blade 220 serve to allow the openings 120 formed on the housing body 110 to communicate with the exhaust line 10 or to block from the exhaust line 10, and to do this, the upper blade 210 and the lower blade 220 have communication holes 212 and 222 and sealing portions 214 and 224. The communication holes 212 and 222 are connected slidably to each other in such a manner as to extend the removed portion of the exhaust line 10.

Figure 5:
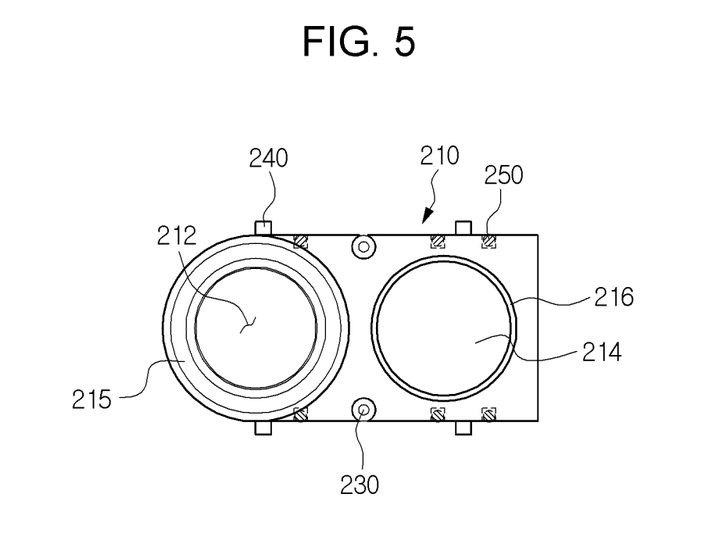
FIG. 5 is a plan view showing an upper blade of the valve assembly according to the present invention.

In this case, the communication hole 212 is penetrated into the upper blade 210 in a thickness direction of the upper blade 210, and as shown in FIG. 5, the sealing portion 214 is formed close to the communication hole 212 and has a sealing member insertion groove 216 formed on an outer periphery thereof in such a manner as to have the same size as the communication hole 212. Of course, the communication hole 212 has a sealing member insertion groove 215 formed on an outer periphery thereof in such a manner as to allow a sealing member to be disposed thereon.

As shown in FIG. 2, the blade connecting member 230 is disposed between the upper blade 210 and the lower blade 220 and serves to connect the upper blade 210 and the lower blade 220 with each other so that a distance between the upper blade 210 and the lower blade 220 is freely varied. Accordingly, the blade connecting member 230 has a shape of a simple pin in such a manner as to be inserted into insertion grooves formed on the upper blade 210 and the lower blade 220. In this state, the blade connecting member 230 is slidable in upward and downward directions.

Next, as shown in FIG. 5, the protrusions 240 protrude from the sides of the upper blade 210 and are thus slidably coupled to the valve movement guide parts 140. Accordingly, the number of protrusions 240 on one side of the upper blade 210 is at least two. At this time, each protrusion 240 has a given diameter so that it can be inserted into the corresponding valve movement guide part 140, and further, each protrusion 240 may have a bearing (not shown) mounted on the outer peripheral surface thereof so as to reduce a frictional force generated therefrom. In the same manner as above, also, the protrusions 240 protrude from the sides of the lower blade 220.

Moreover, as shown in FIG. 5, bearings 250 are mounted on the sides of the upper blade 210 to reduce a frictional force generated between the sides of the upper blade 210 and the inner surfaces of the housing body 110. The bearings 250 may be formed of ball bearings, and they serve to reduce the frictional force to the housing body 110 to suppress particles from being generated.

Next, as shown in FIG. 2, the valve driving part 300 is located on one side of the valve housing 100 in such a manner as to be connected to the valve 200 and serves to horizontally move the valve 200 in the direction perpendicular to the exhaust line 10. In detail, as shown in FIG. 2, the valve driving part 300 includes a blade connector 310, a power supplier 320, and a connection shaft 330.

Figure 7:
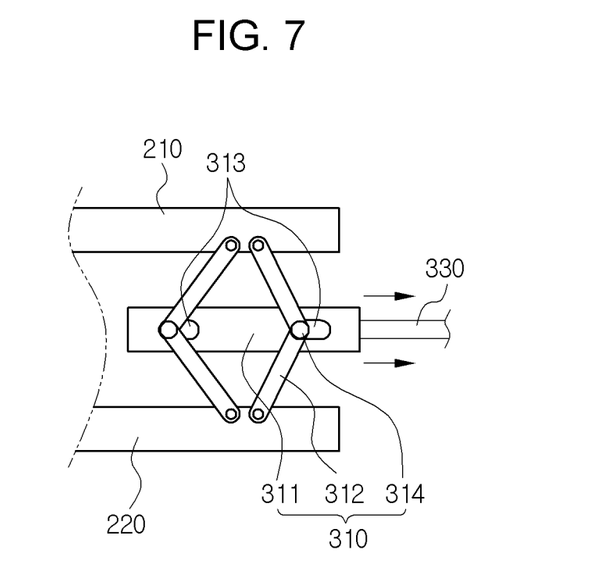
FIGS. 7 and 8 are plan views showing driving processes of a valve driving part of the valve assembly according to the present invention.
Figure 8:
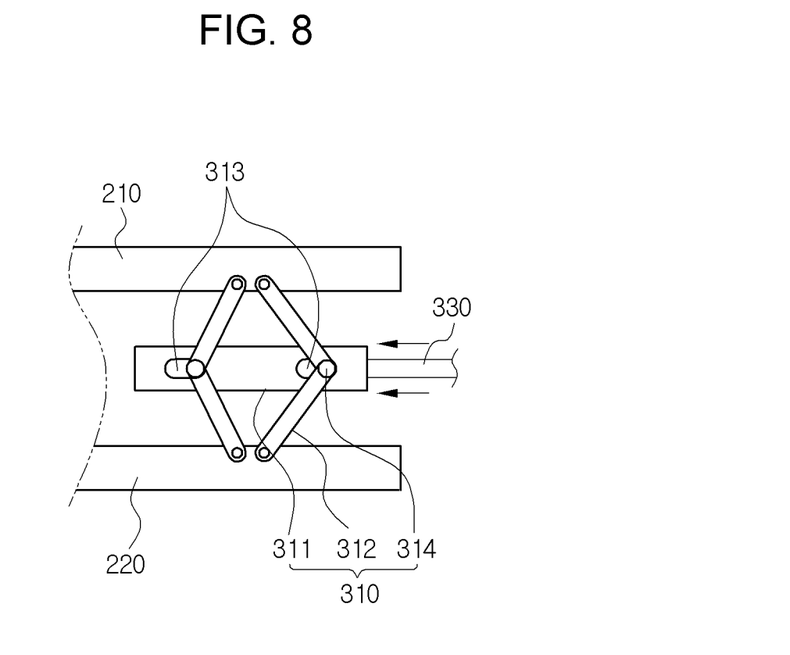

The blade connector 310 is located inside the valve housing 100 and is coupled to the upper blade 210 and the lower blade 220, respectively, to drive the upper blade 210 and the lower blade 220 by means of power supplied from the power supplier 320. In more detail, as shown in FIGS. 7 and 8, the blade connector 310 includes a connection block 311 and connection pins 312. The connection block 311 has a pair of long holes 313 formed spaced apart from each other by a given distance in the same direction as the horizontal moving direction, and one end of the connection block 311 is connected to the connection shaft 330 so that the connection block 311 can be horizontally moved. Further, sliding blocks 314 are slidably mounted on the long holes 312.

Further, as shown in FIGS. 7 and 8, each connection pin 312 has one end rotatably coupled to the corresponding sliding block 314 and the other end rotatably coupled to the inner surface of the upper blade 210 or the lower blade 220. In detail, one pair of connection pins 312 is connected to one long hole 313 in such a manner as to be connected to the upper blade 210 and the lower blade 220. One pair of connection pins 312 faces another pair of connection pins 312 formed symmetrically thereto, and accordingly, four connection pins 312 are provided, as shown in FIGS. 7 and 8.

At this time, as shown in FIGS. 7 and 8, desirably, the connection pins 312 have a given small angle in a direction where the pair of sliding blocks 314 faces each other. If the connection pins 312 are located at an angle smaller than 180° in the direction where the pair of sliding blocks faces each other, as shown in FIGS. 7 and 8, a sufficient force is applied to any one side of the front and rear connection pins 312 during forward and backward movements of the valve 200, and the valve 200 can be easily driven.

Next, as shown in FIG. 2, the power supplier 320 is located at the outside of the valve housing 100 and serves to supply power for horizontally moving the blade connector 310. The power supplier 320 is formed of one of various structures providing horizontal movement power, such as an air cylinder, a motor, and so on.

Further, as shown in FIG. 2, the connection shaft 330 serves to connect the power supplier 320 with the blade connector 310 and has a structure of a simple shaft.

According to the present invention, as shown in FIGS. 2 and 4, the valve assembly 1 further includes an insulation plate 340 located between the valve housing 100 and the power supplier 320 to block heat transfer between the valve housing 100 and the power supplier 320. The insulation plate 340 is desirably made of an engineering plastic with thermal stability like PEEK, and so as to reduce a contact area with the valve housing 100, as shown in FIG. 4, the insulation plate 340 desirably has separation grooves 342.

Next, as shown in FIGS. 2 and 3, the valve movement guide parts 140 are located on the inner surfaces of the valve housing 100 to guide the moving path of the valve 200. The valve movement guide parts 140 are formed directly by engraving the inner surfaces of the valve housing 100. Otherwise, they are formed on separate plates, and then, the plates are coupled to the inner sides of the valve housing 100.

Figure 6:
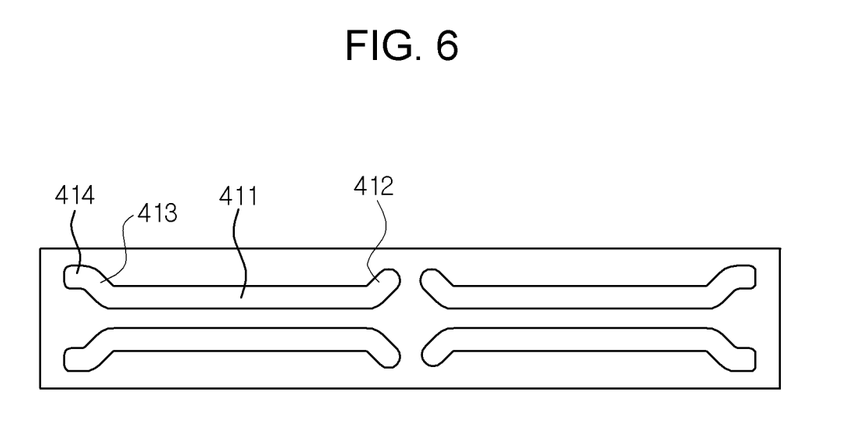
FIG. 6 is a plan view showing a valve movement guide part of the valve assembly according to the present invention.

At this time, as shown in FIG. 6, each valve movement guide part has a horizontal section 411 and inclined sections 412 and 413 so as to guide the valve 200 to communicating and blocking positions. At the blocking position, in detail, as shown in FIG. 6, a short horizontal section 414 is formed after the inclined section 413. At the blocking position, as a result, the upper blade 210 and the lower blade 220 are locked onto the horizontal sections 414, thereby stably blocking the upper and lower openings 120.

At the communicating position, as shown in FIG. 6, only the inclined section 412 is operated. As a result, the upper blade 210 and the lower blade 220 are locked onto the ends of the inclined sections 412, thereby allowing the upper and lower openings 120 to communicate with the exhaust line 10. As the exhaust gas is discharged from the exhaust line 10 at the communicating position, it is very important to maintain the airtightness between the valve housing 100 and the valve 200. At the communicating position, therefore, the upper blade 210 and the lower blade 220 are continuously pressurized by means of the power supplier 320, thereby more reliably ensuring the airtightness.

During the upper blade 210 and the lower blade 220 are passed through the horizontal sections 411, of course, the distance between them becomes short, so that they can stably move horizontally, without any contact with the inner surfaces of the valve housing 100.

According to the present invention, further, the valve assembly 1 has heating parts 500. As shown in FIG. 2, the heating parts 500 are located close to the openings 120 of the housing body 110 to heat an interior of the valve housing 100. If a high temperature process is carried out in the interior of the vacuum chamber, the exhaust gas is also in a heated state. Accordingly, the exhaust gas has to be passed through the valve assembly 1, while being kept at the same temperature, thereby preventing particles from being generated in the valve assembly 1. To do this, the valve housing 100 and the valve 200 are heated by means of the heating parts 500.

According to the present invention, as shown in FIG. 2, the valve assembly 1 further has a positive pressure keeping part 600. The positive pressure keeping part 600 is located on the housing body 110 and serves to inject inert gas into a space between the housing body 110 and the valve 200. If a pressure in the valve housing 100 is kept higher than a pressure of the valve 200 or the exhaust line 10, the probability where the exhaust gas is introduced into the valve housing 100 becomes low, and accordingly, the injection pressure of the inert gas is adjusted by means of the positive pressure keeping part 600 according to the pressure of the exhaust line 10, thereby keeping the pressure of the valve housing 100 higher than the pressure of the exhaust line 10.

MODE FOR INVENTION

Figure 9:
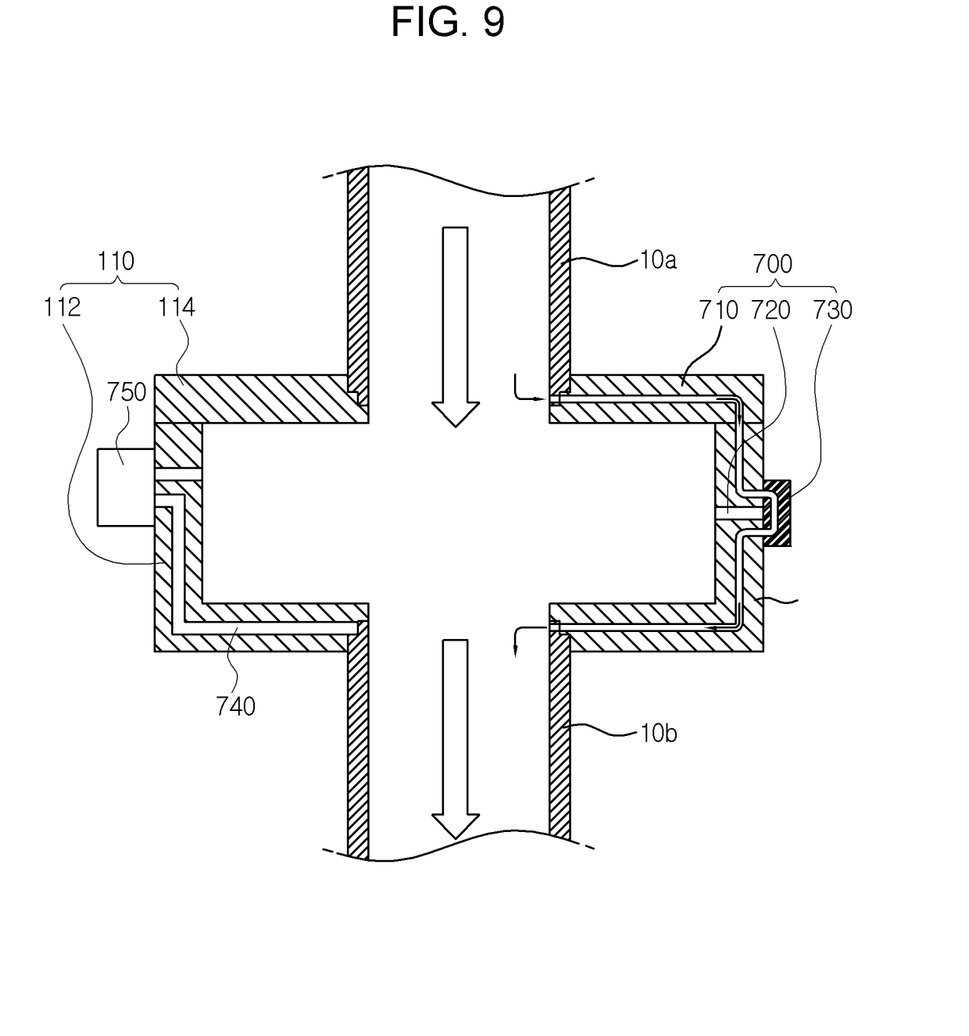
FIG. 9 is a plan view showing a pressure maintaining line and a slow pumping valve of the valve assembly according to the present invention.

According to the present invention, desirably, the valve assembly 1 further has a pressure keeping line 710, a housing connection line 720, and a slow pumping valve 730. As shown in FIG. 9, the pressure keeping line 710 is passed through the housing body 110 and serves as, in the exhaust line 10, a gas passing line whose one end is open to a chamber side exhaust line 10a of the exhaust line 10 and whose other end is open to a pump side exhaust line 10b of the exhaust line 10. The housing connection line 720 is a gas passing line that communicates with the intermediate portion of the pressure keeping line 710 and also communicates with the internal space of the valve housing 100. The internal pressure of the housing body 110 and the pressure of the exhaust line 10 are adjusted by means of the pressure keeping line 710 and the housing connection line 720, so that they can be the same as each other.

Further, as shown in FIG. 9, the slow pumping valve 730 is located on the pressure keeping line 710 and serves to control the pressure keeping line 710. Before the blocking state of the valve 200 is changed into the communicating state, the slow pumping valve 730 is converted from a closed state into an open state, and next, a process where the internal pressure of the housing body 110 is the same as the exhaust line 10 is carried out. After that, if the valve 200 is converted into the open state, malfunctions or troubles can be prevented from occurring due to the difference between the internal pressures of the housing body 110 and the exhaust line 10.

INDUSTRIAL APPLICABILITY

According to the present invention, the valve assembly can be easily installed in the exhaust line of the vacuum chamber and allow the valve to become a portion of the exhaust line in such a manner as to be moved horizontally, such that process contaminants and by products can be perfectly prevented from flowing into the valve assembly and an excellent exhaust effect can be obtained.

The invention claimed is:
1. A valve assembly comprising:
a valve housing inserted into, after removing a portion of an exhaust line of a vacuum chamber, the removed portion of the exhaust line in such a manner as to be open in a direction communicating with the exhaust line and to have a predetermined inner space in a direction perpendicular to the direction communicating with the exhaust line;
a valve movable horizontally inside the valve housing in such a manner as to allow the valve housing to communicate with the exhaust line or to be blocked from the exhaust line;
a valve driving part disposed on one side of the valve housing in such a manner as to be connected to the valve so as to horizontally move the valve in a direction perpendicular to the exhaust line; and
valve movement guide parts disposed inside the valve housing so as to guide a moving path of the valve,
wherein the valve housing comprises
a housing body for providing a horizontal movement space of the valve, and
a pair of openings open in the direction communicating with the exhaust line in a state of being coupled to the exhaust line,
wherein the valve comprises
an upper blade adapted to allow an upper side opening of the pair of openings to communicate with the exhaust line or to block from the exhaust line,
a lower blade located under the upper blade in parallel with the upper blade and adapted to allow a lower side opening of the pair of openings to communicate with the exhaust line or to block from the exhaust line,
a blade connecting member disposed between the upper blade and the lower blade to connect the upper blade and the lower blade with each other so that a distance between the upper blade and the lower blade is freely varied, and
a plurality of protrusions protruding from the sides of the upper blade and the lower blade in such a manner as to be slidably coupled to the valve movement guide parts,
wherein the valve driving part comprises
a blade connector located inside the valve housing in such a manner as to be coupled to the upper blade and the lower blade, respectively,
a power supplier located at the outside of the valve housing to supply power for horizontally moving the blade connector, and
a connection shaft adapted to connect the power supplier with the blade connector, and
wherein the blade connector comprises
a connection block having a pair of long holes formed spaced apart from each other by a given distance in the same direction as the horizontal moving direction,
a pair of sliding blocks slidably mounted on the long holes, and
a pair of connection pins whose one end is rotatably coupled to the corresponding sliding block and whose other end is rotatably coupled to the inner surface of the upper blade or the lower blade.

* * * * *